United States Patent [19]

Peabody

[11] 4,168,180
[45] Sep. 18, 1979

[54] PIGMENT CONCENTRATES

[75] Inventor: Alice R. Peabody, Glens Falls, N.Y.

[73] Assignee: Hercules Incorporated, Wilmington, Del.

[21] Appl. No.: 912,824

[22] Filed: Jun. 5, 1978

Related U.S. Application Data

[63] Continuation-in-part of Ser. No. 762,367, Jan. 25, 1977, abandoned, which is a continuation-in-part of Ser. No. 736,919, Oct. 29, 1976, Pat. No. 4,116,924.

[51] Int. Cl.$^2$ .......................... C08K 9/04; C09B 67/00
[52] U.S. Cl. .......................... 106/308 M; 106/288 B; 106/308 Q; 106/288 Q; 106/308 N; 260/37 N; 260/37 EP; 260/38; 260/39 R; 260/39 P; 260/40 R; 260/42.21; 260/42.22; 260/42.24; 260/42.56; 260/42.57
[58] Field of Search .......... 106/308 M, 308 Q, 288 Q, 106/288 B; 260/42.21, 42.43, 42.57

[56] References Cited

U.S. PATENT DOCUMENTS

| | | | |
|---|---|---|---|
| 3,413,249 | 11/1968 | Luftglass et al. | 260/42.21 X |
| 3,462,390 | 8/1969 | Dunn | 260/42.21 |
| 3,639,331 | 2/1972 | Hattori et al. | 260/42.57 X |
| 3,755,244 | 8/1973 | Hart | 260/42.21 |
| 3,763,085 | 10/1973 | McFadgen | 260/42.11 |
| 3,830,765 | 8/1974 | Fejer | 106/308 M |
| 4,048,272 | 9/1977 | Spicuzza | 260/42.23 X |
| 4,055,439 | 10/1977 | Bäbler et al. | 106/288 Q |
| 4,093,584 | 6/1978 | Zwahlen et al. | 260/40 P |
| 4,127,421 | 11/1978 | Ferrill | 106/308 M |

*Primary Examiner*—Helen McCarthy
*Attorney, Agent, or Firm*—Hazel L. Deming

[57] ABSTRACT

Pigment concentrates which are particularly suitable as colorants for thermosetting powder coating resins are described. The concentrates contain by weight about 35 to about 60% of organic pigments and about 30 to about 65% of certain low molecular weight, friable polymers of styrene and/or alkyl substituted styrenes or about 45 to about 90% of inorganic pigments and about 5 to about 55% of the friable polymer. A dispersing agent is optional and, if present, the weight ratio of polymer to dispersing agent is at least 1.

10 Claims, No Drawings

PIGMENT CONCENTRATES

This application is a continuation-in-part of U.S. patent application Ser. No. 762,367, filed Jan. 25, 1977, and now abandoned, which application in turn is a continuation-in-part of U.S. patent application Ser. No. 736,919, filed Oct. 29, 1976, and now U.S. Pat. No. 4,116,925.

This invention relates to pigment concentrates and particularly to intimate pigment dispersions suitable for use as colorants for thermosettable powder coating resins.

Resin powders offer particular advantages in coating applications because they can be applied without the use of solvents, thus reducing the risk of fire or the release of toxic substances to the atmosphere. Coloration of the powders, however, is necessary for broad utility and pigmented powders are particularly desirable.

Conventionally, pigmented resin powders are manufactured by melt homogenizing suitable resin binders, flow control ingredients and curing agents with a coloring amount of the pigment, cooling the melt, grinding and then screening the particles to a powder. The process has several disadvantages, outstanding of which is the difficulty of achieving good dispersion without prolonged and extensive mechanical working. This problem is particularly difficult when working with the thermosettable powder coating resins such as the polyester, epoxy or polyurethane resins due to the undesirable crosslinking reactions which occur during melt homogenization. Premature or partial crosslinking often results in a powder which is no longer meltable, and hence is not useful. On the other hand, insufficient homogenization results in a non-uniform dispersion of the pigment particles and subsequent surface irregularities in the coating.

It has been proposed in U.S. Pat. No. 3,879,335 to Storck et al. that the foregoing problem can be avoided by forming a dispersion of the pigment in a solution of the polymer in an organic solvent, precipitating the polymer containing the pigment as a fine dispersion using water containing a water-soluble protective colloid as the precipitant and then removing the solvent. Although uniformly colored powdered resins can be formed in this manner without the risk of crosslinking, the requirement that large amounts of organic solvents must be used completely offsets the chief advantage realized with powder coatings.

The art also suggests that color concentrates which are highly pigmented resin compositions can be formed using a variety of resins such as the polymerized rosins, rosin esters, the non-polar aromatic hydrocarbon resins having a melting point of at least about 100° C., polyterpene resins, the vinylidene plastics such as polystyrene, alkylated polymers of heterocyclic N-vinyl monomers, and the like. Concentrates which are intimate dispersions of pigment in polyethylene, polypropylene or mixtures thereof having an average molecular weight of 1000 to 30,000 are disclosed by Hart in U.S. Pat. No. 3,755,244 and pigmented compositions containing molding grade or general purpose polystyrene (number average molecular weight of 50,000 to 250,000 or higher) are taught, for example, by Stober in U.S. Pat. No. 2,470,001, Luftglass et al in U.S. Pat. No. 3,413,249, and Dunn in U.S. Pat. No. 3,462,390. Concentrates containing large amounts of pigment in low molecular weight polyethylene or high molecular weight polystyrene, however, are not compatible with and do not provide high quality dispersions in thermosettable powder coating resins and hence are not acceptable as colorants therefor.

Additionally, Bäbler et al. in U.S. Pat. No. 4,055,439 teach that organic pigments can be obtained in a nondusting granular form by treating the pigment in a specific manner with a granulating assistant which can be any one of a wide variety of synthetic or natural resins such as an aromatic petroleum resin or a polystyrene. The dustless granules are said to provide the same dispersibility and coloristic properties in soft PVC and paint and varnish systems as the starting pigments in powder form. The resin-treated organic pigments of Bäbler et al, however, are practically as difficult to disperse in thermosettable powder coating resin systems as conventional pigments and hence are not acceptable as colorants for such systems.

Now, in accordance with this invention, it has been found that pigment concentrates which have been formed using certain low molecular weight, low softening point friable resins provide high quality dispersions at high pigment levels and that the resulting concentrates are compatible with and particularly suitable as colorants for thermosetting powder coating resins. Further, the pigment dispersions of this invention offer the additional advantage of being granulatable and hence available in a free-flowing, non-dusting form. Because the pigment concentrates are in a highly dispersed state and have low softening points, the concentrates can be readily mixed with natural or uncolored resins or polymers with a minimum of working. The invention thus avoids the necessity of high temperatures and/or prolonged compounding, and reduces the tendency for adverse reactions during processing.

Accordingly, the present invention relates to a pigment concentrate suitable as a colorant for thermosettable powder coating resins, said concentrate being an intimate dispersion containing at least one pigment, a friable resin having a number average molecular weight within the range of about 400 to about 1000 and a Ring and Ball softening point within the range of 75° to 125° C. and being selected from the group consisting of homopolymers of styrene and alkyl substituted styrenes, copolymers of styrene and alkyl substituted styrenes, and copolymers of alkyl substituted styrenes with each other, and, optionally, a dispersing agent the amount of which, when present, is such that the weight ratio of resin to dispersing agent is at least 1. More specifically, when the pigment is an organic pigment, the concentrate will contain by weight from about 35 to about 60% pigment, from about 30 to about 65% of the friable resin and from 0 to about 20% of a dispersing agent, and when the pigment is an inorganic pigment, the concentrate will contain from about 45 to about 90% pigment, from about 5 to about 55% of the friable resin and from 0 to about 10% of a dispersing agent.

The friable resins which are used to form the concentrates of this invention are, as stated, low molecular weight, low softening point homopolymers of styrene and alkyl substituted styrenes, copolymers of styrene and alkyl substituted styrenes and copolymers of alkyl substitutes styrenes with each other. The resins have a number average molecular weight within the range of about 400 to about 1000 and preferably 450 to 850 and a Ring and Ball softening point within the range of 75° to 125° C. and preferably 75° to 115° C. The preferred resins are homopolymers of styrene or of lower alkyl and preferably methyl substituted styrene such as α-methyl styrene or vinyl toluene, and copolymers of such monomers with each other such as, e.g., copolymers of α-methyl styrene with up to about 95%, and preferably from about 10 to about 50% of styrene; copolymers of styrene with from about 5 to about 95% of vinyl toluene or copolymers of vinyl toluene with up to about 95% and preferably from about 10 to about 50% of α-methyl styrene. The hydrogenated forms of the above homopolymers and copolymers can also be used, in which case the resins have reduced aromatic unsaturation and a narrower molecular weight distribution. Usually, when hydrogenated resins are employed, at least about 10% and preferably at least about 25% of the aromatic unsaturation is reduced. The friable resins used in the practice of this invention are known resins. They are prepared by polymerizing the desired styrene monomer or mixtures of the styrene monomers in the presence of a Lewis acid such as $BF_3$ etherate or aluminum chloride or by other known processes which give polymers in the desired molecular weight range. Hydrogenation, if desired, is conventional and techniques for the hydrogenation of aromatic rings are well known. Hydrogenation is preferably accomplished by a standard practice using a nickel catalyst.

The concentrates of this invention can also contain, in addition to the stated amount of pigment and friable resin, a small amount of one or more dispersing agents. The dispersing agents, at the levels used, should have sufficient heat stability to withstand subsequent processing temperatures without decomposition and should be non-reactive with the other ingredients of the concentrate or the powder coating resins with which the concentrate is to be used. The presence of a dispersing agent is optional but frequently desirable to aid in wetting of the pigment or friable resin in the initial stages of formation of the dispersion, to aid in transfer of the pigment from the water to the resin phase, to facilitate granule formation at a later stage and/or to improve ease of let down with the powder resin. The preferred dispersing agents include the cationic surfactants, the anionic surfactants, the cationic-anionic surfactant complexes, and the low molecular weight, low softening point resinous dispersing agents such as the polyolefins, copolymers of olefins with vinyl esters, cyclic ester polymers such as homopolymers and copolymers of epsilon caprolactone, the aromatic petroleum hydrocarbons, the rosins, modified rosins and the rosin derivatives. Particularly preferred cationic surfactants are the substituted tertiary amines which are heterocyclic tertiary amines such as the alkyl imidazolines and oxazolines, the polyethoxylated tertiary amines, primary amines such as dehydroabietylamine and quaternary ammonium compounds such as the quaternary ammonium chlorides derived from adducts of $C_{12}$ to $C_{18}$ fatty acid amines and about 2 to 15 moles of ethylene oxide. The cationic surfactants are capable of forming water-soluble salts with various acids and water-insoluble salts with alkali or anionic surfactants. As their acetate salts they are excellent surfactants with good solubility in water. One of the preferred imidazolines is 1-(2-hydroxyethyl)-2-n-heptadecenyl-2-imidazoline. Suitable as anionic surfactants are those which can be converted to a water-insoluble, oil-soluble form, as for example, by complexing with the above amine surfactants. Typical anionic surfactants include sodium oleate, sodium laurate, sodium palmitate, sodium stearate, sodium naphthenate, sulfonated castor oil, sulfonated petroleum, sulfonated tall oil, sodium butyl naphthalene sulfonate, the sodium sulfonates of the condensation products of alkyl phenols and up to 5 moles of ethylene oxide, e.g., the sodium sulfonate of the condensation product of nonylphenol and 5 moles of ethylene oxide, and the like. Also acceptable are anionic surfactants such as Tergitol 4 (the sodium sulfate derivative of 7-ethyl-2-methyl-4-undecanol), Igepon AC-78 (the coconut oil acid ester of sodium isethionate), Aerosol 22 (tetrasodium-N-(1,2-dicarboxyethyl)-N-octadodecyl sulfosuccinimate), Polywet KX-4 (the potassium salt of a functionalized oligomer), Atlas G-3300 (an alkylaryl sulfonate), and the like.

Suitable resinous dispersing agents are theorized to function as partial solvents for the friable resin or as viscosity reducing agents, and as such, improve the ease of let-down in the powder coating resin. The preferred resinous materials include the low molecular homopolymers and copolymers of ethylene, the low melting polymers of caprolactone, the low melting petroleum type resins, polyterpenes, terpenephenol resins and the rosin and rosin ester type resins. Particularly preferred are the low molecular weight polyethylenes having a density of about 0.91, a softening point within the range of about 97° to 105° C. and a molecular weight within the range of about 1000 to 2000.

The choice and amount of dispersing agent will, of course, vary depending upon a number of factors which include the type of pigment, the pigment particle size, the hydrophiliclipophilic (HLB) nature of the pigment, the amount of pigment utilized and the type of dispersing agent. Generally, the amount will depend primarily upon the type of pigment and its surface area. Usually, inorganic pigments such as cadmium sulfide yellow or titanium dioxide white which have average particle sizes within the range of from about 0.1 micron to about 2.0 microns require only a very small amount of dispersing agent whereas the organic pigments which have a much higher surface area require larger proportions. Generally, if present, the amount of dispersing agent, when the pigment is an organic pigment will range from about 0.5 to about 20% based on the weight of the concentrate and preferably will range from about 3 to about 10% of a resinous dispersing agent or from about 0.5 to about 10% of a water-insoluble, oil-soluble surfactant or surfactant complex, and when the pigment is an inorganic pigment, will range from about 0.5 to about 10% and preferably from about 3 to about 8% of a water-insoluble, oil-soluble surfactant or surfactant complex.

Pigments which can be used to form the concentrates of this invention are any of the solid colorants normally used in the industry for the coloring, opacifying, delustering or otherwise modifying the color of plastics. These include the inorganic and organic prime pigments, extender pigments, metallic pigments, the various finely-divided channel and furnace blacks, and the like. Typical pigments include organic pigments such as the diarylide yellows, the phthalocyanine blues and greens, the quinacridone reds and violets, dioxazine violet, carbon black, and the like; and inorganic pigments such as the cadmium reds and yellows, the cadmium sulfide type pigments, the molybdate oranges, iron oxide yellow and red, and the like. Also suitable are the hydrophilic type pigments such as, for example, titanium dioxide and the lead chromate colors.

The amount of pigment will depend upon the degree of pigmentation desired, the particular pigment and the oil absorption value of the pigment. Since ideally a concentrate will contain the maximum amount of a given pigment, low levels of pigmentation are not desirable and offer no advantages over direct pigmentation. When the pigment is an organic pigment having a high oil absorption value, such as the very jet shades of carbon black, the concentrate will contain from about 35 to about 60% and preferably from 45 to 55% of the pigment, 30 to 60 and preferably 30 to 55% of the friable resin and 0 to 20% of a dispersing agent. On the other hand, when the pigment is an inorganic pigment having a low oil absorption value such as cadmium selenide orange or titanium dioxide, the concentrate will contain from about 45 to about 90%, preferably 70 to 90% of the pigment, about 5 to about 55% and preferably 5 to 30% of the friable resin and 0 to 10% of a dispersing agent.

The pigment concentrates of this invention can be prepared by pebble milling or grinding in a colloid mill or the like a mixture of pigment, friable resin, dispersing agent, if desired, and water to produce an aqueous slurry. Either dried pigment and water or a pigment presscake may be used as the pigment source. Presscakes are preferred where possible as these avoid the aggregation that normally occurs during drying of the pigment. Calcined pigments such as titanium dioxide, cadmium yellows and reds are not available in this form and must be used as dried pigments. Organic pigments such as phthalocyanine blue and green, etc., are available in a presscake form and are advantageously used in this form. The amount of water is not critical, the practical requirement being that sufficient water must be present to permit satisfactory processing. The presence of a nonionic surfactant, wetting agent or defoamer is optional but usually desirable to aid in pigment wetting or to control foam at this stage. The amount of such additives will usually range from about 0.5 to 4% by weight of the total dry ingredients utilized. Typical additives of the above type include such water-soluble material as the alkylphenoxy polyoxyethanols, which are known nonionic surfactants, defoamers such as 2-ethyl hexanol, and the like.

Following grinding the aqueous slurry is preferably transferred to a suitable apparatus such as an agitated tank fitted with suitable steam and water lines for granulation. Sufficient water is usually added to the tank to dilute the pigment slurry to a point where it is possible to maintain adequate fluidity and a small amount of a solvent, for example, a hydrocarbon solvent such as mineral spirits is added to the water to soften or dissolve the resin and the mixture is heated to remove at least a portion of the solvent. Usually a temperature range from about 85° to about 97° C. is sufficient to steam distill a major portion of the solvent from the mixture so that the granules will be firm enough to be transported to separatory means for removing the bulk of the water. After dewatering, the granules are washed and dried in conventional manner. For example, dewatering can be carried out by running the cooled batch through any type of conventional filtering apparatus such as a filter press, screen, etc. The partially dewatered granules can then be washed with fresh water to remove residual salts and any other water-soluble materials. Drying can be accomplished by conventional means such as tray driers, vacuum driers, etc.

The concentrates of this invention can be used to color a wide variety of plastics such as the thermosetting and thermoplastic resins but are particularly useful for coloring the low melting thermosettable resins used for powder coating applications. Typical of resins of this type are the unsaturated polyesters, the epoxy resins, the polyurethane type resins, the amino resins, such as the area or melamine formaldehyde resins, the phenolic resins, the acrylate resins, and the like.

Other ingredients such as heat and light stabilizers, antioxidants, antistatic agents, viscosity improvers, mold release agents, flame retardants, fillers, extenders, and the like, can also be present in he pigmented compositions of the invention in amounts which do no detract from the advantages of the invention. Usually, the amount of such additives will not exceed about 1 or 2 percent by weight of the total composition.

Having described the invention generally, the following examples are given to illustrate specific embodiments thereof. All parts and percentages are by weight and all softening points are Ring and Ball softening points, unless otherwise indicated.

EXAMPLE 1

6106 Parts of a presscake (26.7% pigment solids) of α-copper phthalocyanine blue, 245 parts of powdered polyethylene (molecular weight of about 1500, a density of 0.91 and a softening point of 102° C.), 1382 parts of a partially hydrogenated copolymer of about 70% of α-methyl styrene and about 30% of styrene having about 35% of its initial aromatic unsaturated reduced, a softening point of 100° C., a number average molecular weight of about 700 and an acid number of less than 1, 102 parts of a non-ionic wetting agent of the polyether alcohol type and 9010 parts of water were charged to a pebble mill. The charge was ground for 60 hours, after which time the resulting slurry was dumped.

10480 Parts of the above slurry (1306 parts, dry weight) were transferred to an agitated tank equipped with steam heating means, 360 parts of mineral spirits (boiling point range: 120° to 150° C.) were added to the tank and the slurry was heated to 95° C. with agitation and maintained at 95° C. until most of the solvent was removed. Cooling water was next added to reduce the temperature to 50° C. and harden the granules. The batch was then run out onto a screen where the bulk of the water was separated, the partly dewatered material was washed with water and the washed material was dried for 24 hours at 71° C. The dried product was in the form of small granules of a dispersion containing 50% of the blue pigment, 42.5% of the copolymer of α-methyl styrene and styrene and 7.5% of the polyethylene. The granules were non-dusting when handled in equipment conventional for the incorporation of colorants in plastics.

A sufficient amount of the dried granules produced above was let down with a commercial thermosettable polyester powder coating resin (Ring and Ball softening point range of 107°–119° C., acid number of 9–14 and a theroretical hydroxyl value of 50–60) to provide a pigment level of 0.5%, the let down was mixed portionwise on a hot plate at 127° C. for 25 strokes to simulate extrusion and the mixture was pressed into a film about 2 mils thick between two glass slides, the film being in the shape of a circular mount having a diameter of 14 millimeters. Examination of the film 420 magnification using a field having the area prescribed by a 0.5 millimeter diameter circle showed that the dispersion quality was excellent, background development was good and there were many units/field in the range of 0.5-2 microns, rare units/field at 4 microns and very few units/mount at 6-9 microns and a single unit at 27 microns. When the granules were let down in the polyester powder coating resin to a pigment level of 1.5%, which level more closely approximated conventional use, dispersion quality was excellent and the particles were of essentially the same size as those at the 0.5% pigment level.

For the sake of comparison, a control concentrate containing 50% of the copper phthalocyanine blue pigment and 50% of the polyethylene (molecular weight of about 1500, density of 0.91 and softening point of 102° C.) was also prepared and let down to the 0.5% and 1.5% pigment level in the polyester powder coating resins, as above. Examination of the pressed film containing 0.5% pigment showed good background development, slight mottling and the presence of a considerable number per field of colorless globules in the 1–2 micron size range. When the concentrate was let down in the polyester powder coating resin to a pigment level of 1.5%, a large number of colorless globules in the 1–4 micron size range were observed, indicating the presence of a 2-phase system and poor compatibility.

EXAMPLE 2

The procedure of Example 1 was repeated except that no polyethylene was used in the preparation of the slurry and the amount of the copolymer of α-methyl styrene and styrene used was 1627 parts. The dried product was small, non-dusting granules of a dispersion containing 50% of the blue pigment and 50% of the copolymer. When the dried granules were let down in the polyester powder coating resin according to the procedure of Example 1, microscopic studies on the film showed that the dispersion quality was satisfactory, background development was good and there were many units/field in the range of 0.5 to 2 microns, occasional units/field up to 6 microns, rare units/mount to 12 microns, and as rate unit/mount at 18 microns.

EXAMPLE 3

The general procedure of Example 1 was repeated except that the pebble mill was charged with 1870 parts of carbon black dry color (Regal 660), 255 parts of the polyethylene, 1275 parts of the copolymer, 34 parts of the nonionic wetting agent and 16030 parts of water, the charge was ground for 20 hours, an additional 102 parts of the nonionic wetting agent and 68 parts of an antifoaming agent were added to the charge and milling was continued for an additional 20 hours prior to dumping.

10800 Parts of the above slurry (1306 parts, dry weight) were then added to an agitated tank containing 1564 parts of water, the contents were heated under agitation to 85° C., 190 parts of mineral spirits were added, heating was continued to 90° C., the mixture was maintained at 90° C. for 0.5 hour, the temperature was increased to 95° C. and the mixture was maintained at 95° C. until most of the solvent was removed. Recovery of the batch as in Example 1 gave a dry product which was small, non-dusting granules of a dispersion containing 55% of carbon black, 37.5% of the copolymer and 7.5% of the polyethylene. When the dried granules were let down in the polyester powder coating resin according to the procedure of Example 1, microscopic studies on the film showed that the dispersion quality was excellent, essentially all of the background was of submicron size, there were occasional units/field at 2 microns, rare units/field at 6 microns, very few units/mount at 9–12 microns and 2–3 units/mount at 27 microns.

EXAMPLE 4

The procedure of Example 3 was repeated except that an equal amount of a polystyrene having a softening point of 75° C. and a number average molecular weight of about 700 was substituted for the copolymer of α-methyl styrene and styrene. The product of this example was in the form of small, non-dusting granules which contained 55% of carbon black, 37.5% of the polystyrene and 7.5% of the polyethylene. When the granules were let down in the polyester powder coating resin in the manner of Example 1, the dispersion quality was excellent and the particle size range was comparable to that of Example 3.

For the sake of comparison, a control concentrate was prepared by the procedure of this example except that an equal amount of ground, molding grade polystyrene having a melting point of 230° C. and an average molecular weight of about 50,000 was used in place of the low molecular weight polystyrene of this example. Granulation was poor with a large amount of fines and the carbon black was not well dispersed in the polystyrene, a large amount of the pigment washing off the granules during recovery. When the granules were let down in the polyester powder, dispersion quality was very poor and the background was very weak.

Microscopic examinations at 400 power magnification of representative fields (approximately 450 microns in diameter) of the pressed films containing a sufficient amount of the concentrate of this example or the control concentrate to provide a pigment level of 0.5% gave the following results.

|  | Film containing concentrate of Example 4 | Film containing the control concentrate |
| --- | --- | --- |
| Background | Strong; submicroscopic to 0.5 micron | Weak; submicroscopic to 0.5 micron |
| Aggregate Count |  |  |
| at 1–2 microns | 5–15/field | 50–200/field |
| at 3–5 microns | 2–5/field | 30–50/field |
| at 6–10 microns | <1/field | 15–30/field |
| at over 10 microns | <0.01/field 2–5/mount | 5–15/field — |
| Maximum aggregate size noted | 27 microns | 144 microns |

Analysis of the above data confirm that outstanding advantages in dispersibility are achieved by the practice of this invention and that the invention provides high quality pigment dispersions which are particularly suitable as colorants for thermosetting powder coating resins.

EXAMPLE 5

The general procedure of Example 1 was repeated except that the pebble mill was charged with 4505 parts of Perylene Red pigment presscake (33.3% pigment solids), 1584 parts of the copolymer of α-methyl styrene and styrene of Example 1, 56 parts of a 45% solution of an anionic surfactant (the potassium salt of a functionalized oligomer commercially available at Polywet KX-4), 258 parts of the polyethylene of Example 1 and 12,640 parts of water and, following dumping, the slurry was treated as follows. 11200 Parts of the ground slurry (1333 parts, dry weight) were added to an agitated tank containing 920 parts of water, 26.7 parts of the nonionic wetting agent of Example 1 and 190 parts of mineral spirits were added with agitation, about 20 parts of 32% aqueous hydrochloric acid was added to reduce the pH to 3.0, and the temperature of the mixture was raised to 95° C. and maintained thereat to remove the solvent. Cooling water was next added to reduce the temperature to 60° C., and the batch was recovered as in Example 1. The dried product was small, non-dusting granules containing 44.5% of the Perylene Red pigment, 47.0% of the copolymer, 7.7% of the polyethylene and 0.8% of the surfactant. When the granules were let down in the polyester powder in the manner of Example 1, microscopic studies showed that the dispersion quality was excellent, the background was good and there were many units/field in the range of 0.5-3 microns, rare units/field over 4 microns and rare units/mount up to 27 microns. Portions of the granules were also let down to the 0.5% pigment level in nylon molding powder and fiber grade poly(ethylene terephthalate) having an intrinsic viscosity of 0.60 (60/40 phenol/tetrachloroethylene) and a melting point of 265° C. using the mixing procedure of Example 1 except that the temperatures employed were 232° C. and 268° C., respectively. Microscopic studies on pressed film indicated that the dispersion quality was excellent and essentially all of the particles were in the submicron range.

EXAMPLE 6

The general procedure of Example 1 was repeated except that the pebble mill was charged with 250 parts of a pigment type medium color furnace black (Black Pearls 900), 250 parts of a 15% aqueous solution of a cationic surfactant, the acetate salt of 1-(2-hydroxyethyl)-2-n-heptadecyl-2-imidazoline, 37.5 parts of the polyethylene of Example 1, 175 parts of the copolymer of α-methyl styrene and styrene of Example 1, and 2138 parts of water and the charge was ground for 40 hours. Next, 1800 parts of the charge (250 parts, dry weight), 473 parts of water and 8.75 parts of the nonionic surfactant of Example 1 were added to an agitated tank and the contents were heated to 80° C. with agitation, following which time 29 parts of mineral spirits were added and the mixture was heated to 85° C. Next, 11.8 parts of sodium metaphosphate were added to the mixture to adjust the pH to 4.9 and the mixture was heated to 90° C., maintained at 90° C. for 15 minutes, heated to 95° C., held at 95° C. for 20 minutes, cooled to 60° C. with cooling water, and the batch recovered as in Example 1. The product was in the form of small, non-dusting granules containing 50% of the black pigment, 35% of the copolymer, 7.5% of the polyethylene and 7.5% of the surfactant. When the granules were let down in the polyester powder in the manner of Example 1, microscopic examination showed that the dispersion quality was excellent, that the background was essentially in the submicron size and that there were a few units/field at 1-3 microns, very few units/mount over 7 microns and very rare units/mount up to 27 microns.

EXAMPLE 7

900 Parts of cadmium selenide orange lithopone, 72 parts of a 25% aqueous solution of cationic surfactant, the acetate salt of dehydroabietylamine, 64 parts of the resin of Example 1 and 2182 parts of water were charged to a pebble mill and the charge was ground for 20 hours, after which time the resulting slurry was dumped.

One-half of the above slurry (500 parts, dry weight) and 800 parts of water were introduced into an agitated tank and the tank contents were heated with agitation to 60° C., at which temperature 18 additional parts of the cationic surfactant solution were added and heating was continued to 75° C. Next, 3.0 parts of sodium metaphosphate and then 135 parts of a 10% aqueous solution of a commercial anionic surfactant, an alkylaryl sulfonate (Atlas G3300) were added to the mixture and heating was continued to 88° C., at which temperature 15 parts of mineral spirits were added. The temperature of the mixture was next raised to 95° C., and maintained thereat until the solvent was removed, following which cooling water was added to reduce the temperature to 60° C. and the batch was recovered in the manner of Example 1. The product was in the form of small, non-dusting granules containing 88.4% of the cadmium selenide pigment, 6.3% of the copolymer and 5.3% of a surfactant complex. When the granules were used to color polyester powder in the manner of Example 1, microscopic examination showed that the dispersion quality was good, essentially all of the particles of the background were in the 0.5-2 micron range and there were rare units/mount in the range of 9-27 microns.

EXAMPLE 8

750 Parts of carbon black dry color (Regal 660), 1250 parts of a 15% aqueous solution of the cationic surfactant of Example 6 and 1000 parts of water were charged to a pebble mill and the charge was ground for 20 hours, after which time the resulting slurry was dumped. The charge was next passed twice through a Gaulin mill at 4500-5000 p.s.i., giving a fluid aqueous dispersion of carbon black particles in the colloidal size range.

400 Parts of the above dispersion (100 parts, dry weight) and 75 parts of a ground copolymer of about 75% vinyl toluene and about 25% of α-methyl styrene having a softening point of 75° C. and a number average molecular weight of about 635 were added to an agitated tank containing 1200 parts of water, the charge was agitated for 5 minutes, 53 parts of mineral spirits were added to the tank and the mixture was heated to 80° C. with agitation. Next, sufficient of a 25% aqueous solution of sodium hydroxide was added to raise the pH from 5.0 to 9.7, and the mixture was heated to 93° C. with agitation and maintained at 93° C. until most of the solvent was removed. Cooling water was next added to reduce the temperature to 50° C. and the batch was then recovered as in Example 1. The dried product was in the form of small granules of a dispersion containing 50% of the carbon black, 37.5% of the copolymer of vinyl toluene and α-methyl styrene and 12.5% of the surfactant. When the granules were let down in the polyester powder in the manner of Example 1, microscopic examination showed that the dispersion quality was excellent, and that essentially all of the particles were in the submicron range. There were few units/field at 2 microns and rare units/field at 9 microns.

What I claim and desire to protect by Letters Patent is:

1. A pigment concentrate suitable as a colorant for thermosettable powder coating resins, said concentrate consisting essentially of, by weight, from about 45 to about 90% of at least one inorganic pigment, from about 5 to about 55% of a friable resin having a number average molecular weight within the range of about 450 to about 850 and a Ring and Ball softening point within the range of 75° to 125° C. and being selected from the group consisting of homopolymers of styrene and alkyl substituted styrenes, copolymers of styrene and alkyl substituted styrenes, and copolymers of alkyl substituted styrenes with each other and from 0 to about 10% of a dispersing agent, the weight ratio of resin to dispersing agent, when present, being at least 1.

2. The concentrate of claim 1 containing from 0.5 to 10% of a water-insoluble, oil-soluble surfactant or surfactant complex as the dispersing agent.

3. The concentrate of claim 2 wherein the friable resin is a copolymer of α-methyl styrene with 10 to 50 weight % of styrene.

4. The concentrate of claim 3 wherein the copolymer is hydrogenated.

5. A pigment concentrate suitable as a colorant for thermosettable powder coating resins, said concentrate consisting essentially of, by weight, from about 35 to about 60% of at least one organic pigment, from about 30 to about 65% of a friable resin having a number average molecular weight within the range of about 450 to about 850 and a Ring and Ball softening point within the range of 75° to 125° C. and being selected from the group consisting of homopolymers of styrene and alkyl substituted styrenes, copolymers of styrene and alkyl substituted styrenes, and copolymers of alkyl substituted styrenes with each other and from 0 to about 20% of a dispersing agent, the weight ratio of resin to dispersing agent, when present, being at least 1.

6. The concentrate of claim 5 containing 45 to 55% of an organic pigment, from 30 to 55% of the friable resin and 0.5 to 20% of a dispersing agent.

7. The concentrate of claim 6 containing from 3 to 10% of low molecular weight polyethylene as the dispersing agent.

8. The concentrate of claim 7 wherein the friable resin is a copolymer of α-methyl styrene with 10 to 50 weight % of styrene.

9. The concentrate of claim 8 wherein the copolymer is hydrogenated.

10. The concentrate of claim 7 wherein the friable resin is polystyrene.